United States Patent

[11] 3,607,640

| [72] | Inventor | Donald M. Krawiec |
| | | Thompsonville, Conn. |
| [21] | Appl. No. | 739,221 |
| [22] | Filed | June 24, 1968 |
| [45] | Patented | Sept. 21, 1971 |
| [73] | Assignee | Combustion Engineering, Inc. |
| | | Windsor, Conn. |

[54] PERIMETER STRIP FOR A NUCLEAR REACTOR FUEL ASSEMBLY SUPPORT GRID
9 Claims, 6 Drawing Figs.

[52] U.S. Cl. ............................................ 176/78, 176/76
[51] Int. Cl. ............................................ G21c 3/34
[50] Field of Search ............................................ 176/76, 78, 74, 81

[56] References Cited
UNITED STATES PATENTS

| 3,228,854 | 1/1966 | Bekkering et al. | 176/78 |
| 3,261,758 | 7/1966 | Maldague et al. | 176/76 |
| 3,301,765 | 1/1967 | Eyre et al. | 176/76 X |
| 3,308,031 | 1/1967 | Pon | 176/76 X |
| 3,322,645 | 5/1967 | Barker et al. | 176/76 X |
| 3,330,734 | 7/1967 | Ashcroft et al. | 176/76 X |
| 3,366,546 | 1/1968 | Anthony et al. | 176/78 X |
| 3,423,287 | 1/1969 | Anthony et al. | 176/78 |
| 3,481,832 | 12/1969 | Richert | 176/78 X |

*Primary Examiner*—Carl D. Quarforth
*Assistant Examiner*—Gary Solyst
*Attorneys*—Carlton F. Bryant, Eldon H. Luther, Robert L. Olson, John F. Carney, Richard H. Berneike, Edward L. Kochey, Jr. and Lawrence P. Kessler ABSTRACT: A perimeter strip for a nuclear reactor fuel assembly support grid. The perimeter strip forms the outer edge of an egg-crate-type fuel-rod-spacing grid and is rigidly welded to the strips passing intermediate the fuel rods. It comprises a central portion parallel to the fuel rods and spaced therefrom as well as upper and lower portions parallel to the fuel rods at a location inwardly of the central portion. Sloping portions of the strip join the central portion and the upper and lower portions, with the distance between the outer surface of the outer fuel rods and the outer surface of the upper and lower portions being less than the distance between the outer surface of the central portion. The upper and lower portions are arched inwardly slightly to contact alternate fuel rods, while the and portion is formed to make resilient spring contact with the intermediate fuel rods. The sloped portion has holes therethrough adjacent the arches where rigid contact is made with the fuel rods. The egg crate structure is welded to the perimeter strip intermediate the arches and springs only at the upper and lower portions.

PATENTED SEP 21 1971   3,607,640

INVENTOR
DONALD M. KRAWIEC
BY E L Kochey
ATTORNEY

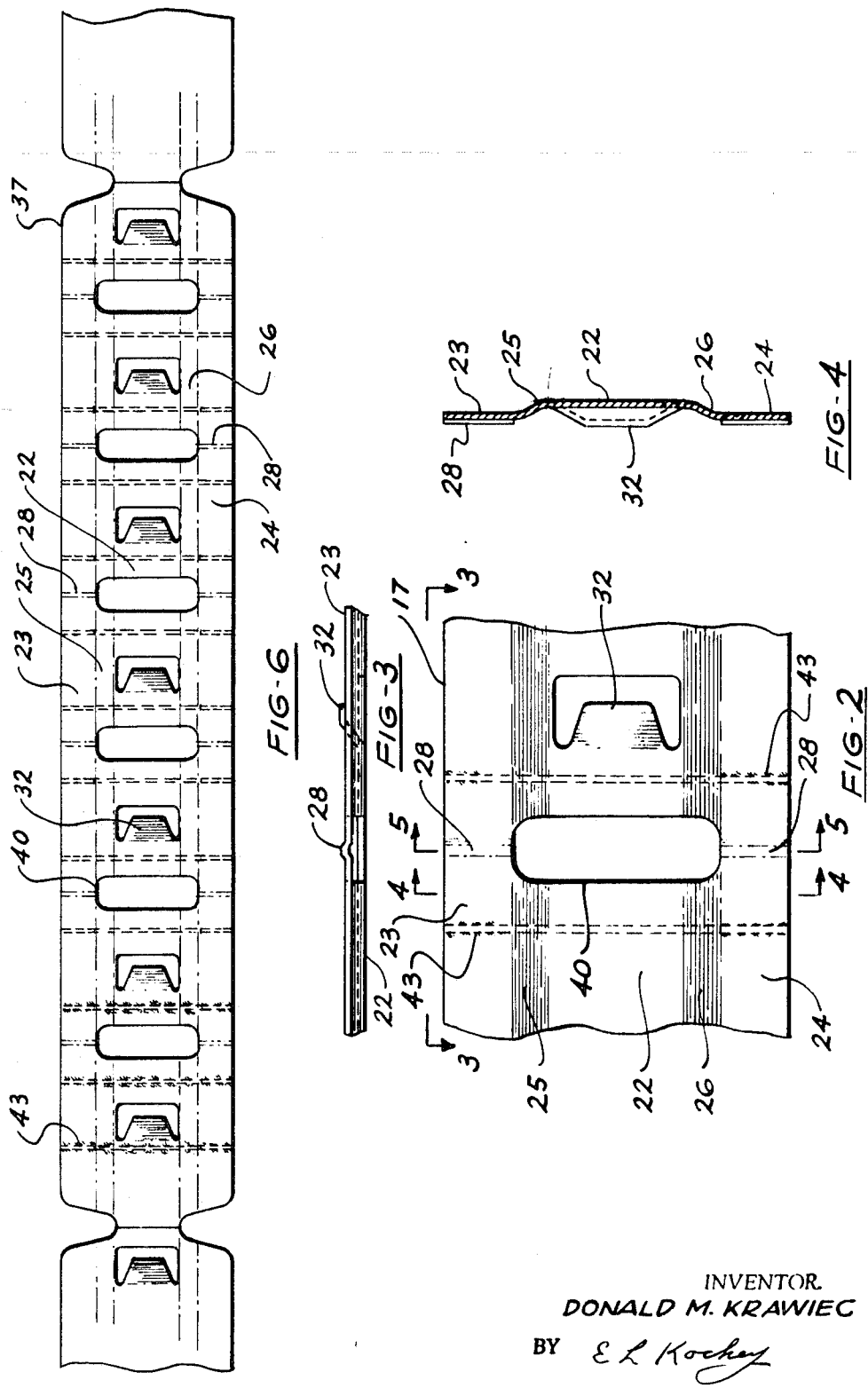

PERIMETER STRIP FOR A NUCLEAR REACTOR FUEL ASSEMBLY SUPPORT GRID

BACKGROUND OF THE INVENTION

This invention relates to nuclear reactors and in particular to spacer grids for spacing the fuel rods forming a fuel assembly as well as for spacing the outer fuel rods of adjacent assemblies.

The core of a nuclear reactor is frequently formed by encasing the fissionable material in long cylindrical tubes. These long slender tubes (for instance, about 10 feet long and about one-half inch in diameter) are readily susceptible to vibration and bowing. Fission occurs in the fuel within these rods with the rods being surrounded by a coolant which frequently also acts as a moderator. This coolant flows longitudinally of the tubes removing the heat generated by the nuclear reaction.

Should there be insufficient flow at any point to satisfactorily cool the fuel elements, structural failure or burnout of the fuel element will occur. This local relative flow deficiency can occur either due to the fuel rods themselves becoming too close to one another or due to a local flow obstruction caused by a spacer grid. The fuel element may then reach excessively high temperature leading to melting or decomposition of the cladding material which may, in turn, lead to leakage of fission products into the reactor coolant.

Expansion differentials and construction tolerances can lead to bowing of the individual fuel rods thereby distorting the uniform spacing desired. Also, flow through the reactor core can lead to vibration of these slender rods. It is, therefore, conventional practice to supply spacer grids at a plurality of longitudinal locations which maintain a minimum desired spacing between the fuel rods and which also, by means of resilient restraint, prevent or minimize vibration. If the point of contact between the restraining support grid and the rod is too extensive, hot spots develop at the point of contact leading to rod failure. On the other hand if the point of contact is too small, excessive wear leads to fretting through of the cladding material. Therefore generally a line contact is preferred to maximize the wearing surface while minimizing the tendency for hot spots to develop. A spacer grid of this type is illustrated in U.S. Pat. application Ser. No. 488,852 by Andrew Anthony and Adolph Veits filed Sept. 21, 1965, now Pat. No. 3,423,287.

A reactor core construction using finger-type control rods within the fuel bundle rather than cruciform control rods between the bundles is illustrated in U.S. Pat. application Ser. No. 632,509 by Royce Rickert filed Apr. 14, 1967, now U.S. Pat. No. 3,481,832. Particularly in such an environment an attempt is made to locate adjacent fuel assemblies so that the spacing between the outer rods of each fuel assembly approaches the spacing between rods within a fuel assembly. This cannot be completely achieved since some allowance must be made for the bowing of the fuel assemblies themselves, and therefore some additional clearance between the fuel assemblies is required. It is, however, important that some provision would be made to prevent the outer fuel rods from coming closer together than the acceptable minimum spacing so as to avoid hot spots at that location in the core.

In assembling the core, one fuel assembly comprised of a plurality of fuel rods is lowered into place at a time, with the adjacent assembly then sliding down along side the installed assembly. Due to the difficulties of working in the environment of a nuclear reactor, it is important that these assemblies be designed so that succeeding assemblies may be lowered into place without hanging up on one another.

Since the spacer material absorbs neutrons and is a parasitic member decreasing the efficiency of the nuclear reactor, it is important that the grid structure provide the maximum of restraint with a minimum of material. It is also generally accepted practice to restrain a fuel rod rigidly on two sides while using a spring restraint on the other sides, thereby providing resilient restraint in all directions with firm predetermined spacing.

SUMMARY OF THE INVENTION

In accordance with the present invention, a perimeter strip for an egg-crate-type fuel rod spacer is formed to space adjacent fuel bundles, insure a longitudinal coolant flow passage, and provide a firm support and spacer for the outer rods of the fuel assembly. The central portion of the perimeter strip is remote from the outer fuel rod and contacts the perimeter strip of the adjacent fuel assembly as required to maintain a minimum spacing between the outer fuel rods of adjacent assemblies. Upper and lower portions of the strip are in contact with a portion of the outer fuel rods of the surrounded assembly, and rigidly space these rods. Other rods may be resiliently restrained by a spring formed as an element of the central portion. The sloped portion joins the upper and central portions as well as the lower and central portions providing the lateral spacing between these portions. The sloped portions has holes therethrough to provide for the passage of coolant in a direction parallel to the fuel rods.

The distance between the outer surface of the outer fuel rod and the upper and lower portions is less than the distance between the outer surface of the upper and lower portions and the outer surface of the central portion so that adjacent fuel assemblies may be lowered into place without any possibility of hangup on the perimeter strips. The sloped portion of the strip also provides increased stiffness of the perimeter strip for the same material thickness.

This invention provides minimum spacing between the outer rods of adjacent fuel bundles thereby avoiding hot spots due to the adjacent fuel rods becoming too close together. The openings in at least the sloped portion of the perimeter strip provide for vertical flow through the strip, which becomes particularly critical when adjacent fuel assemblies are bowed to such an extent that the adjacent spacing perimeter strips are touching. The invention also provides a support for the outer fuel rods in such a manner as to permit the use of a rigid or spring support at any particular desired location.

BRIEF DESCRIPTION OF THE DRAWINGS

FIG. 2 is an enlarged side view of a portion of the perimeter strip illustrating the design having flow openings only in the sloped portion;

FIG. 3 is a plan view of the perimeter strip illustrated in FIG. 2;

FIG. 4 is a sectional view through line 4—4 of FIG. 2 taken at a location off the point of contact between the perimeter strip and the outer fuel rods;

FIG. 6 is a developed side view of a perimeter strip having the flow openings extending through the central portion of the strip as well as through the sloped portion.

DETAILED DESCRIPTION OF THE INVENTION

Figure 1:
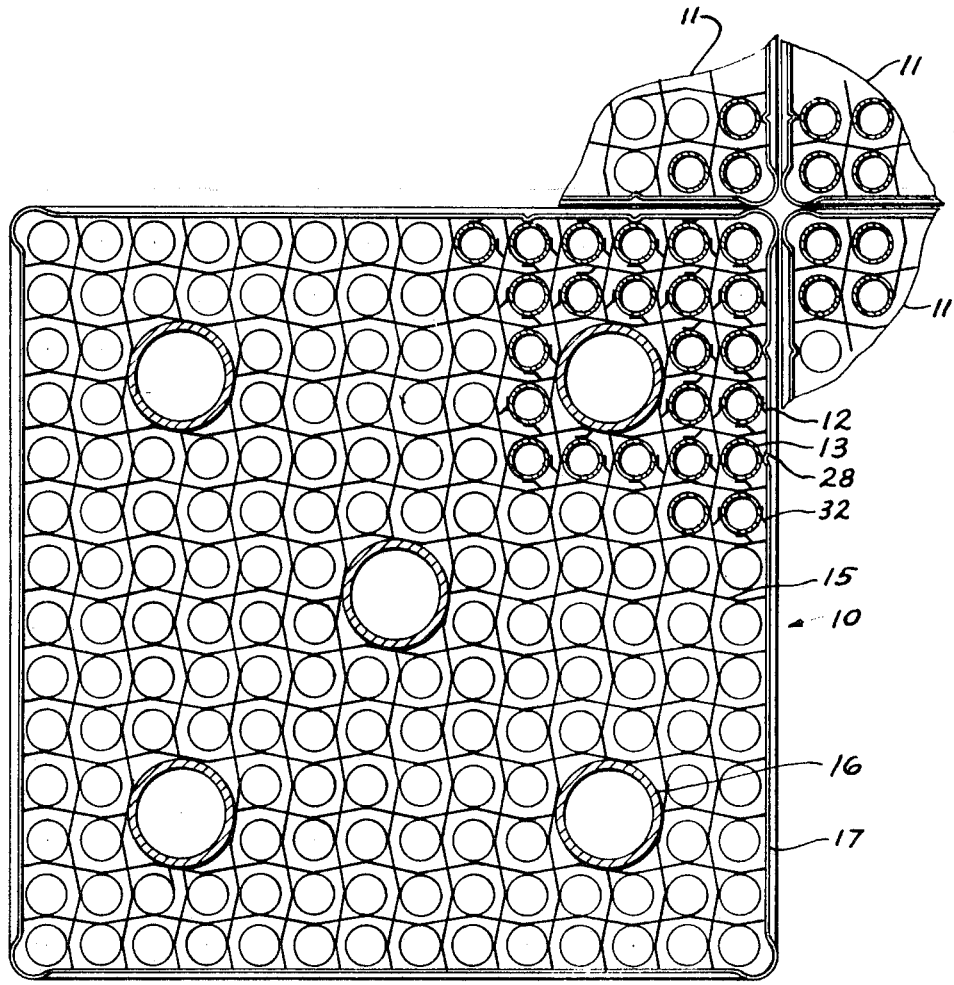
FIG. 1 is a plan sectional view through a fuel assembly in a reactor core and through a portion of three adjacent fuel assemblies.

A nuclear reactor core is generally formed of a plurality of fuel assemblies with these assemblies being formed as a unit before installation within the reaction core. Such a fuel assembly 10 is illustrated in FIG. 1 along with portions of adjacent fuel assemblies 11. Each of the fuel assemblies is formed of a plurality of slender tubes 12 containing fissionable material 13. These tubes are 0.440 inch in diameter and 11 feet long with 176 of them being combined to form a inch rod assembly. The fuel rods are rigidly joined at the opposite ends and are spaced at locations intermediate the ends by support grid inch. 15. These support grid structures are generally as described in U.S. Pat. application Ser. No. 632,509 filed Apr. 14, 1967, with control rod guide tubes 16 being used to hold the support grids in the appropriate longitudinally spaced relationship. Perimeter strip 17, which is the subject of my invention, surrounds the fuel rod assembly and is fastened to the support grid structure 15. FIGS. 2–5 generally illustrate the details of a first embodiment of the perimeter strip. This strip is formed of zirconium 1 ⅝inches high and 0.025 inch thick. The strip has a central portion 22 which is designed so that the outer surface of this strip is 0.075 inch remote from the outer tube 12 of the fuel assembly which is a distance equal to one-half the minimum desired spacing between fuel rods. An upper portion 23 and a lower portion 24 of the strip are each formed with the surface parallel to the fuel rods. The upper portion is joined to the central portion by the sloped portion 25 and the lower portion 24 is joined to the central portion 22 by the slop portion 26. Arches 28 are formed in the upper and lower portions above and below openings 30 cut in the sloped portion, with these arches being placed at a location where rigid contact with the outer fuel rods is desired. As indicated in FIG. 1, these points are selected so that the rigid support is used on fuel rods having a spring on the side opposite the perimeter strip. This arch is only 0.010 inch. deep and 0.040 inch wide. Particularly with a material such as zirconium which will not accept much elongation without failure, a very small offset should be used. Tube contact using this small offset is made possible due to the fact that the upper and lower portions are substantially closer to the tubes because of the offset achieved by sloped portions 25 and 26. The arch 28 should be sufficiently wide to insure contact with the tube in light of fabrication tolerances but sufficiently narrow to permit considerable flow near the point of contact thereby avoiding stagnation and formation of steam bubbles.

Openings 30 are provided in the upper and lower sloped portions at a location adjacent the point of contact between the perimeter strip and the tubes. The opening extends at least to the tangent points of the bends forming the slope so that the central and upper portions are entirely straight at the location of the opening. The openings may extend completely through the central portion, merging into a single opening encompassing the central portion, as well as the slopes. The openings permit flow of coolant in a direction to the fuel rods thereby avoiding the obstruction and the concomittant hot spots which would occur, particularly in the situation where adjacent perimeter strips come into contact as can be visualized by inspection of FIG. 5.

Figure 5:
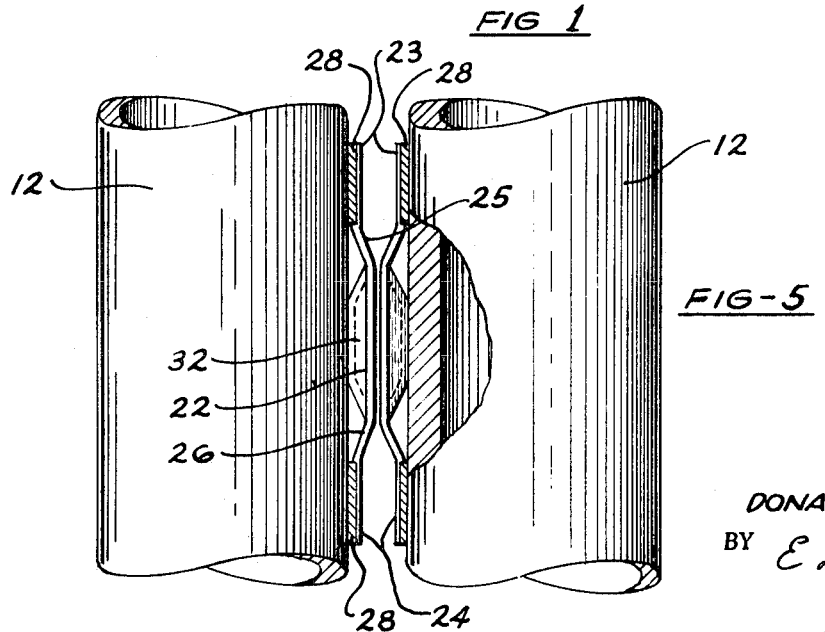
FIG. 5 is a sectional side elevation through line 5—5 of FIG. 2 taken at the location where the perimeter strip is in contact with the outer tubes, and also illustrating the outer tubes of an adjacent fuel bundle along with the perimeter strip of the adjacent fuel bundle in the nominal installed position.

The arch 28 is in rigid contact with the outer fuel rods 12, and the outer surface of the upper and lower portions 23 and 24 are 0.035 inch. from the rigid contact points and therefore the outer surface of fuel rod 12. The sloped portions 25 and 26 are formed such that the distance between the outer surface of the upper and lower portions 23 and 24, respectively, and the outer surface of the central portion 22 is 0.040 inch, this being greater than the 0.035 inch. dimension above. Referring to FIG. 5 and visualizing the left-hand fuel assembly being in place with the right-hand assembly being lowered into place, it will be noted that should there be any inclination for interference between the two assemblies, the right-hand tube will be rubbing on the outer edge of the perimeter strip as it is lowered into place. Due to the dimension relationship previously described, the lower portion 24 of the right-hand assembly cannot hang up on the upper portion 23 of the left-hand assembly but will instead strike the upper slope 25. The right-hand perimeter strip will therefore slide off the left-hand assembly perimeter strip thereby avoiding any hangups during assembly.

Resilient spring portions 32 are formed in the central portion 22 of the perimeter strip. They are shown in the relaxed position in FIG. 5, and in the deflected position in FIG. 6. These springs function generally as those in the remainder of the grid structure and may be more easily designed since they extend from a portion of the perimeter strip remote from the tube than would be the case were they to extend from a closer portion of the perimeter strip. These are located at points in the perimeter where the tubes which they contact have a rigid support on the opposite side. The opening for these springs may be extended to include the portion of the slope thereby promoting flow in the area of the springs, if desired. This, however, does interfere with the rigidity achieved by the illustrated design wherein the sloped portion 25 forms a strengthening member to increase the rigidity of the upper portion 23. While the strengthening effect does not continue through the arch 28, it does increase the restraint on the end portions of the material containing arch 28.

The egg crate structure is shown in FIGS. 2–5 as welded only to the upper and lower portions 23 and 24 at a location on either side of openings 30 as indicated by welds 33. This provides the necessary rigidity and provides an opening between the egg crate and the perimeter strip for horizontal currents of flow. Where the opening 30 extends through the central portion the egg crate structure may be welded throughout the entire height of the strip, to increase its rigidity.

FIG. 6 illustrates a second embodiment of the perimeter strip in which the flow openings extend throughout the central portion of the strip as well as through the sloped portions. This perimeter strip 37 has generally the same configuration as the other strips with the only difference being the size and shape of the openings and the extent of the weld between the perimeter strip 37 and the egg crate structure 15.

The openings 40 are cut through the upper sloped portion 25, the lower sloped portion 26 and the central portion 22 of the perimeter strip. These openings are narrower than the openings in the other embodiment since additional flow area is now available due to the absence of the thickness of the central portion 22 at this critical flow location. Since cutting these openings throughout the central portion has a weakening tendency on the strip, welds 43 between the egg crate structure and the perimeter strip 37 extend throughout the entire height of the strip. While this embodiment also shows an alternate arrangement of rigid arches and spring supports, this strip with its openings could be employed where rigid arches only are desired. Particularly in such an arrangement the width of the solid material left in the central portion should exceed the width of the openings so as to avoid any possibility of the protrusions from one perimeter strip inadvertently engaging within the openings of the adjacent perimeter strip. In the embodiment shown using the springs, there is, of course, ample width of material between the openings to preclude such inadvertent engagement.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A perimeter strip for a nuclear reactor fuel assembly support grid, the fuel assembly being formed of a plurality of parallel slender fuel rods in spaced relation and arranged for coolant flow generally parallel thereto, the support grid having a plurality of strips passing intermediate the fuel rods to space and restrain the fuel rods from lateral vibration, the perimeter strip comprising: a thin strip passing around the bundle of fuel rods and connected to said support grid, having a central portion parallel to said fuel rods and spaced therefrom, having an upper portion parallel to said fuel rods at a location inwardly of said central portion, an upper sloped portion joining said central and upper portions, having a lower portion parallel to said fuel rods at a location inwardly of said central portion, and a lower sloped portion joining said central and lower portions; said upper and lower sloped portions having rigid contact points formed from arches for rigid contact with at least a portion of the outer fuel rods of said fuel rod assembly; the lateral distance between the inward surface of said arches and the outer surface of said upper and lower portions being less than the lateral distance between the outer surface of said upper and lower portions and the outer surface of said central portion; and said sloped portion having holes therein for the passage of coolant flow therethrough.

2. A perimeter strip as in claim 1 wherein the openings in said sloped portion are immediately adjacent the rigid contact points of said upper and lower portions.

3. A perimeter strip as in claim 1 wherein said upper and lower portions have arches extending the height of the respective portions having an axis parallel to the fuel rods whereby said arches form said rigid contact points.

4. A perimeter strip as in claim 2 having also an elastic spring portion extending from said central portion and being in resilient contact with at least a portion of the outer fuel rods.

5. A perimeter strip as in claim 4 wherein alternate outer fuel rods are in rigid contact with the peripheral strip and the intermediate outer fuel rods are in resilient contact with said elastic spring portions.

6. A perimeter strip as in claim 2 wherein said central portion has a flat portion extending between the corresponding openings in said upper and lower sloped portions, said support grid being of an egg crate construction; each of the support grid strips passing intermediate the fuel rods welded to said perimeter strip only at the upper and lower portions.

7. A perimeter strip as in claim 2 wherein the distance from the outer surface of the outer fuel rods to the outer surface of the central portion of the perimeter strip is equal to one-half the spacing between the fuel rods of the fuel assembly.

8. A perimeter strip as in claim 2, said central portion having openings therein throughout its entire height at locations adjacent said rigid contact points, whereby a single opening extends throughout the central portion as well as the upper and lower sloped portions.

9. A perimeter strip as in claim 8 wherein the width of said openings in said central portion is less than the width of the material remaining in said central portion between openings.